(12) United States Patent
Trine et al.

(10) Patent No.: US 6,742,975 B2
(45) Date of Patent: Jun. 1, 2004

(54) LOCKING CARGO BAR

(75) Inventors: Barry Trine, Fremont, IN (US);
Matthew Clemens, Angola, IN (US)

(73) Assignee: Vestil Manufacturing Company, Angola, IN (US)

( * ) Notice: Subject to any disclaimer, the term of this patent is extended or adjusted under 35 U.S.C. 154(b) by 0 days.

(21) Appl. No.: 10/162,519

(22) Filed: Jun. 4, 2002

(65) Prior Publication Data

US 2003/0223839 A1 Dec. 4, 2003

(51) Int. Cl.[7] .............................................. A61D 45/00
(52) U.S. Cl. ...................................................... 410/151
(58) Field of Search .............................. 410/151, 143, 410/145; 211/105.3; 248/354.1

(56) References Cited

U.S. PATENT DOCUMENTS

| | | | |
|---|---|---|---|
| 1,520,134 A | | 12/1924 | Mizer |
| 1,629,718 A | * | 5/1927 | Lockard et al. |
| 1,793,035 A | * | 2/1931 | Whitney |
| 2,263,698 A | | 11/1941 | Hodgson |
| 2,490,889 A | | 12/1949 | Stallard |
| 2,735,251 A | | 2/1956 | Dlugosch |
| 2,766,704 A | | 10/1956 | McMahon |
| 3,183,855 A | * | 5/1965 | Adler |
| 3,976,145 A | | 8/1976 | Blair |
| 4,313,702 A | * | 2/1982 | DiMartino .................... 410/94 |
| 4,343,578 A | | 8/1982 | Barnes |
| 4,676,536 A | * | 6/1987 | Arbic et al. .............. 248/354.1 |
| 5,014,954 A | * | 5/1991 | Merl ........................... 248/285 |
| 5,018,918 A | * | 5/1991 | Jacobs et al. ............... 410/145 |
| 5,190,337 A | | 3/1993 | McDaniel ....................... 296/3 |
| 5,524,854 A | * | 6/1996 | McSwain et al. ......... 248/354.1 |
| 5,526,972 A | * | 6/1996 | Frazier et al. ............... 224/539 |
| 5,697,742 A | * | 12/1997 | House ......................... 410/151 |
| 5,978,987 A | | 11/1999 | Wang |
| 6,131,749 A | * | 10/2000 | Crockett et al. .......... 211/105.3 |
| 6,398,192 B1 | * | 6/2002 | Albritton .................... 256/13.1 |
| 6,419,434 B1 | * | 7/2002 | Rahn .......................... 410/151 |
| 6,488,268 B1 | * | 12/2002 | Albritton .................... 256/13.1 |

\* cited by examiner

*Primary Examiner*—D. Glenn Dayoan
*Assistant Examiner*—H. Gutman
(74) *Attorney, Agent, or Firm*—Bose McKinney & Evans LLP (57) ABSTRACT

An apparatus for stabilizing cargo in a cargo area includes a stabilizing member having a first end, a second end, and a hinge positioned between the first and second ends. The ends of the stabilizing member are configured to engage surfaces of a cargo area to stabilize cargo packed therein. The hinge includes a locking portion configured to lock the stabilizing member in an extended position and a folded position.

19 Claims, 8 Drawing Sheets

LOCKING CARGO BAR

FIELD OF THE INVENTION

The present invention generally relates to cargo bars for retaining cargo in a packed position within a cargo area, and more specifically to a cargo bar that locks in a folded position and an extended position.

BACKGROUND OF THE INVENTION

Cargo bars are typically used to secure cargo packed in a cargo area, such as the trailer of a vehicle. Generally, cargo bars are wedged between the sides of the cargo area to prevent cargo packed in the cargo area from shifting or moving beyond a certain point (defined by the cargo bar) as the vehicle travels.

In order to accommodate different sized cargo areas, it is desirable to provide a cargo bar that has an adjustable length when in the extend, in-use position. Additionally, to conserve space, it is desirable to provide a cargo bar that may be collapsed, or folded for storage when not in-use. A cargo bar that can be moved between an extended and folded position should also have a locking mechanism to ensure that the cargo bar remains in the desired position.

The features and advantages of the present invention described below, as well as additional features and advantages, will be readily apparent to those skilled in the art upon reference to the following description and the accompanying drawings.

DETAILED DESCRIPTION OF EMBODIMENTS OF THE INVENTION

The embodiments described below are merely exemplary and are not intended to limit the invention to the precise forms disclosed. Instead, the embodiments were selected for description to enable one of ordinary skill in the art to practice the invention.

Figure 1:
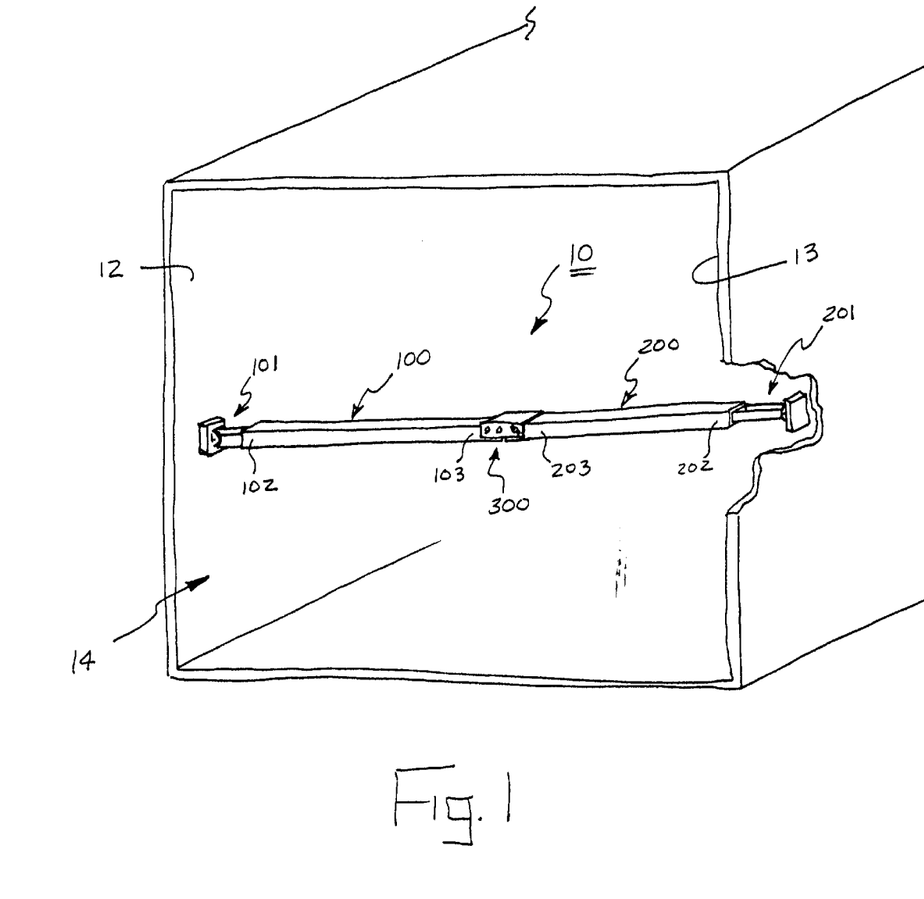
FIG. 1 is a partially fragmented, perspective view of a cargo bar according to one embodiment of the present invention in an in-use position in a cargo area.

As shown in FIG. 1, a stabilizing member or cargo bar 10 of the present invention generally includes a first member 100, a second member 200, and a coupler or hinge 300. Cargo bar 10, when in use, may extend generally horizontally between side surfaces 12, 13 of a cargo area 14 (such as a moving van or semi-trailer) to retain cargo packed within cargo area 14 and minimize shifting or movement of the cargo and resulting damage. Of course, cargo bar 10 may extend vertically or in some other orientation to prevent movement or shifting of the cargo.

Figure 1A:
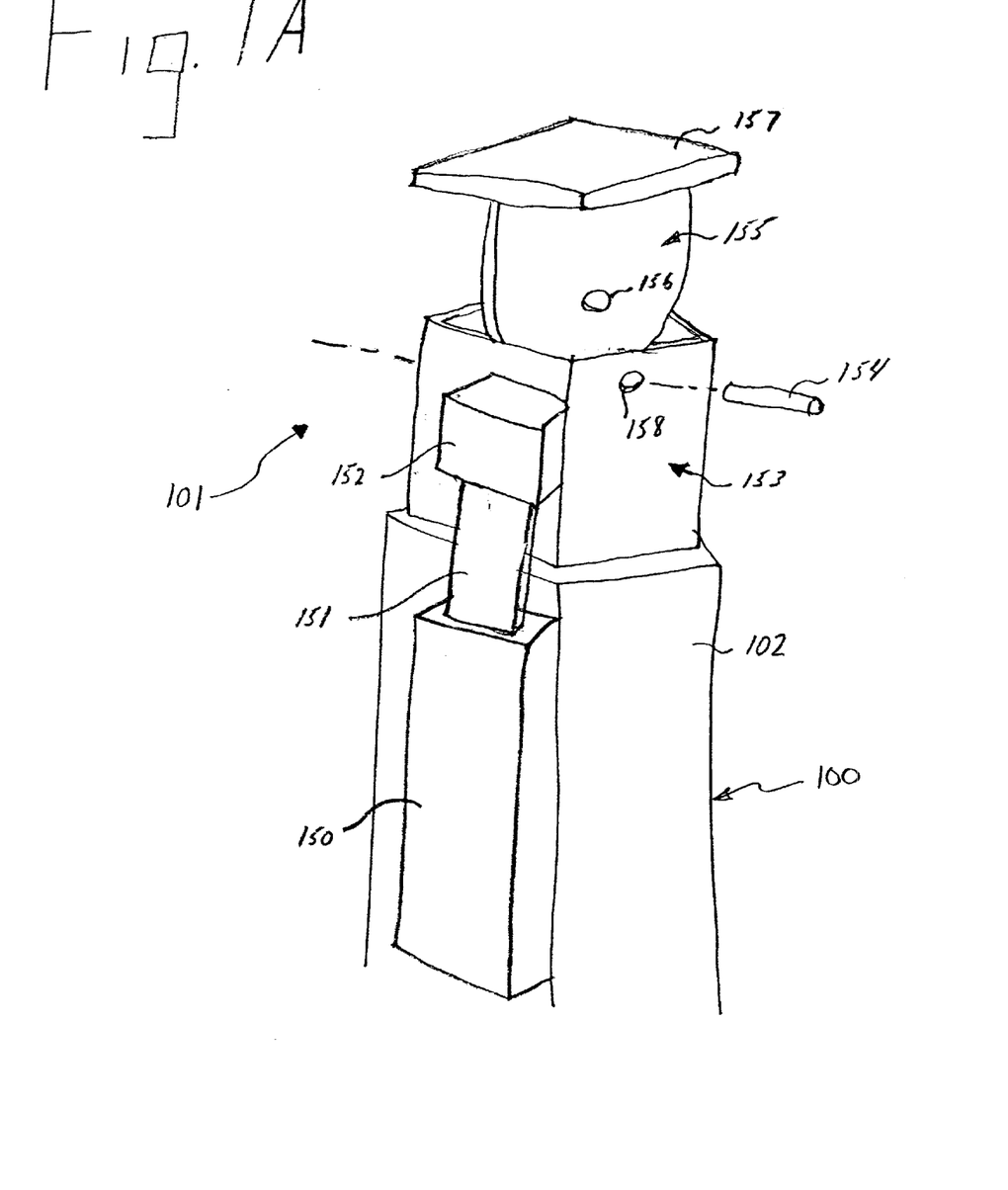
FIG. 1A is a partially fragmented, perspective, exploded view of one embodiment of an end portion of the cargo bar shown in FIG. 1.

An articulating, adjustable pad assembly 101 is adjustably attached to end 102 of first member 100 and designed to engage or contact, for example, surface 12 of cargo area 14. Alternatively, pad assembly 201 (connected to end 202 of second member 200) may articulate and be adjustable. Still another alternative design uses two articulating, adjustable pad assemblies. As shown in FIG. 1A, articulating, adjustable pad assembly 101 includes a telescopic portion 153, a pad 157, and a plate 155. Plate 155 is attached to pad 157 in an orientation that is substantially perpendicular to the plane defined by pad 157. Plate 155 includes an opening 156. Opening 158 and a coaxially opposing opening (not shown) in telescopic portion 153 are aligned to receive a fastener 154. Opening 156 is aligned with opening 158 and the coaxially opposing opening (not shown) and fastener 154 is inserted to pivotally couple plate 155 to telescopic portion 153. Also shown in FIG. 1A are telescopic actuator 150, rod 151, and support 152. Telescopic actuator 150 allows the user to extend or retract telescopic portion 153. Rod 151 is rigidly attached to support 152 and extendably coupled to telescopic actuator 150. Support 152 is rigidly coupled to telescopic portion 153. As actuator 150 extends or retracts rod 151, support 152 extends or retracts telescopic portion 153 relative to first member 100. In one embodiment, telescopic actuator 150 is a ratcheting jack mechanism. Any of a variety of other suitable mechanisms for extending and retracting pad 157 may be used.

Figure 1B:
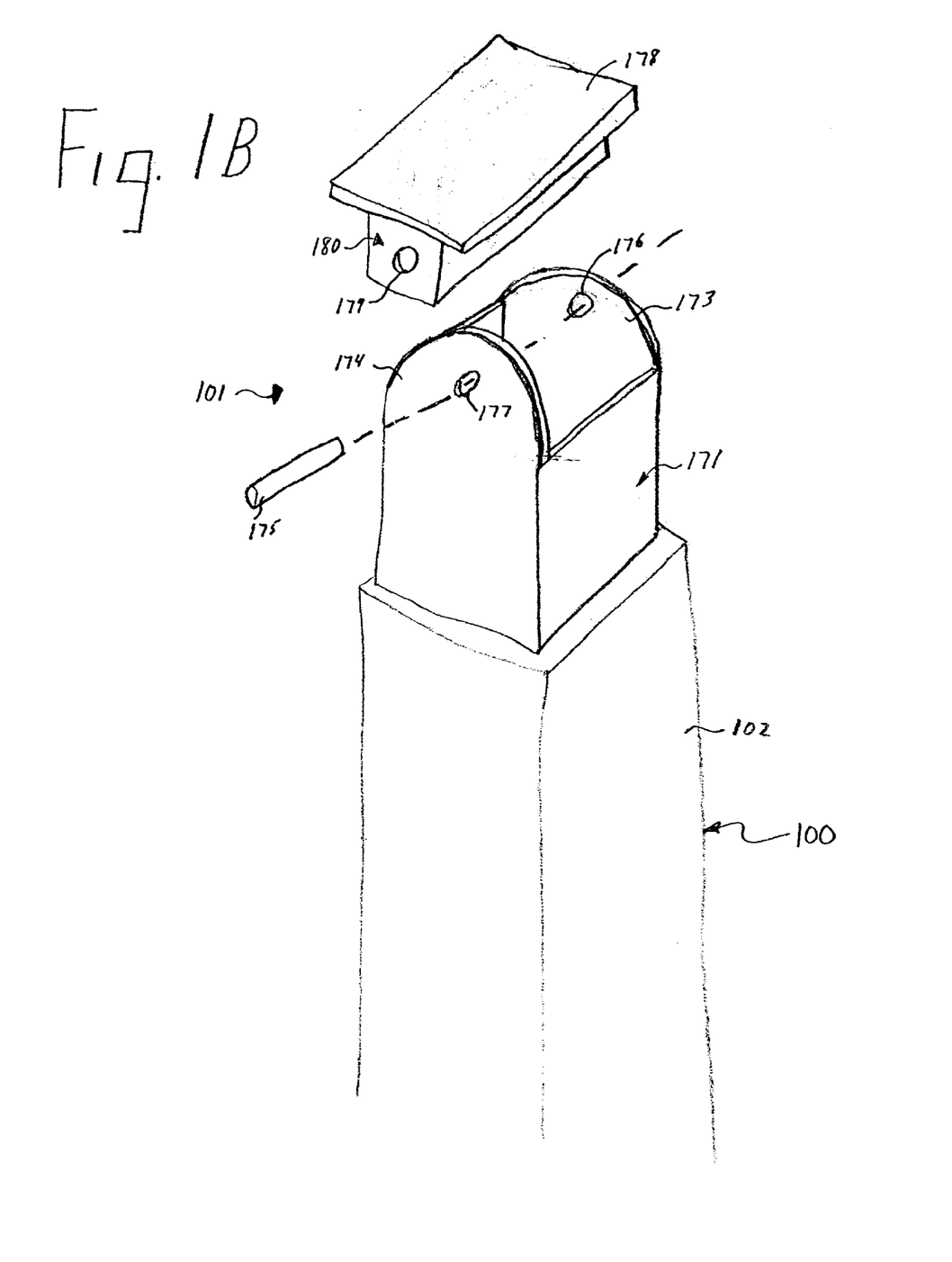
FIG. 1B is a partially fragmented, perspective, exploded view of another embodiment of an end portion of the cargo bar shown in FIG. 1.

An alternative embodiment of articulating, adjustable pad assembly 101 is shown in FIG. 1B. Articulating, adjustable pad assembly 101 includes a pad 178, a support 180, a telescopic portion 171, and ends 173 and 174. Ends 173 and 174 are formed on telescopic portion 171 and are substantially C-shaped. Openings 176 and 177 are formed in ends 173 and 174, respectively, to accept a fastener 175. Support 180 is coupled to plate 178. Opening 179 and a coaxially opposing opening (not shown) are formed in support 180 to allow pad 178 to rotate about the axis of the openings. Opening 179 and the coaxially opposing opening (not shown) are aligned with openings 176 and 177. Next, fastener 175 is inserted through the openings in end 174, support 180, and end 173. Pad 178 is then free to rotate about the axis defined by fastener 175 to adjust to the uneven surfaces of a cargo area. Telescopic portion 171 may be moved into and out of first member 100 using a telescopic actuator as described above with reference to FIG. 1A.

The other end 103 of first member 100 is designed to couple to hinge 300 as is further described below. A second articulating, adjustable pad assembly 201 is adjustably attached to end 202 of second member 200 and designed to engage or contact, for example, surface 13 of cargo area 14. Although first member 100 and second member 200 are shown formed in the shape of a bar or tube having a substantially rectangular cross section, a variety of other shapes providing sufficient rigidity may be used. First member 100 and second member 200 may be made of steel, aluminum, or other suitable material.

Figure 2:
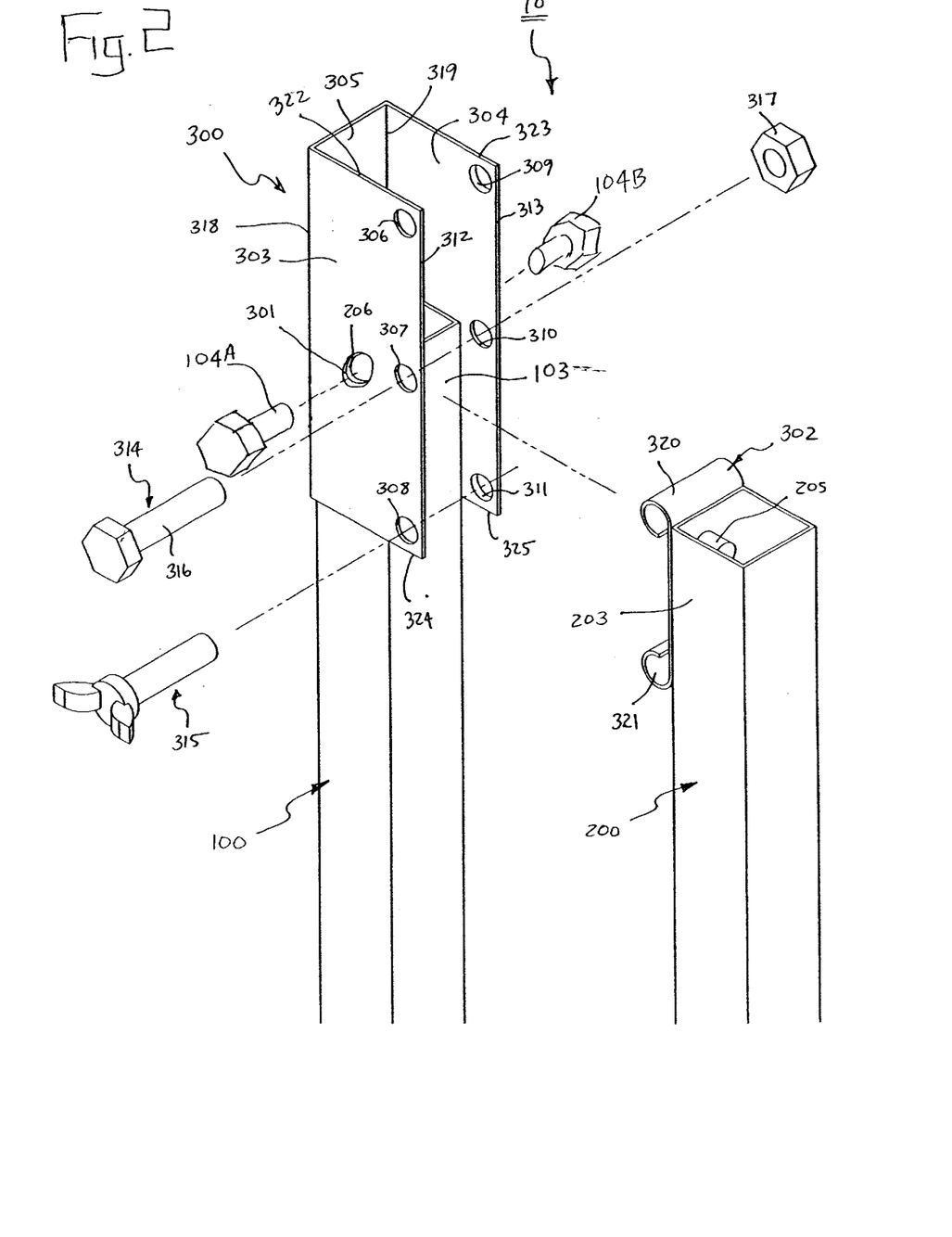
FIG. 2 is a partially fragmented, perspective, exploded view of components of the cargo bar shown in FIG. 1.

Referring now to FIG. 2, the other end 103 of first member 100 is configured to couple to hinge 300 using fasteners, such as bolts 104A, 104B. More specifically, bolt 104A extends through an opening in hinge 300 and threads into a corresponding opening 206 formed into end 103 of first member 100. Similarly, bolt 104B extends through an opening (not shown) in hinge 300 and threads into a corresponding opening 206 (not shown) formed into the other side of end 103. As should be apparent to one of ordinary skill in the art, bolts 104A–B may be replaced by a single bolt that extends through hinge 300 and end 103 (to receive a nut) to secure hinge 300 to end 103 of first member 100. Alternatively, hinge 300 may be welded or otherwise permanently secured to or integral with end 103 of first member 100.

Figure 4B:
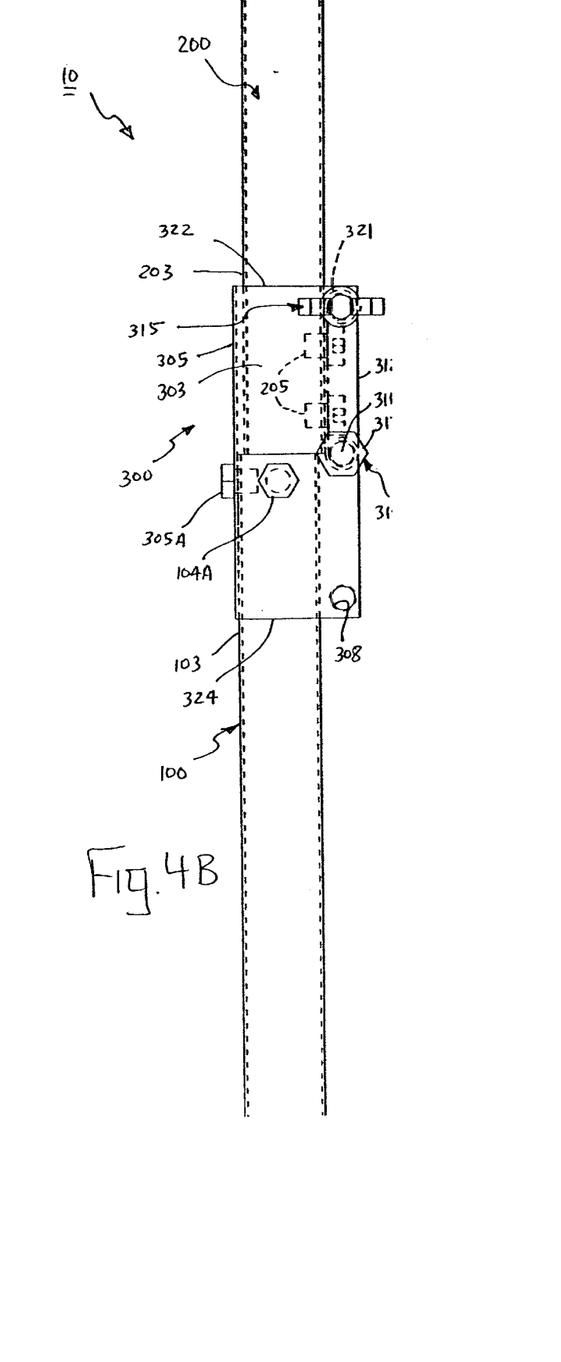
FIG. 4B is a partially fragmented, side elevational view of the cargo bar of FIG. 4A.
Figure 5:
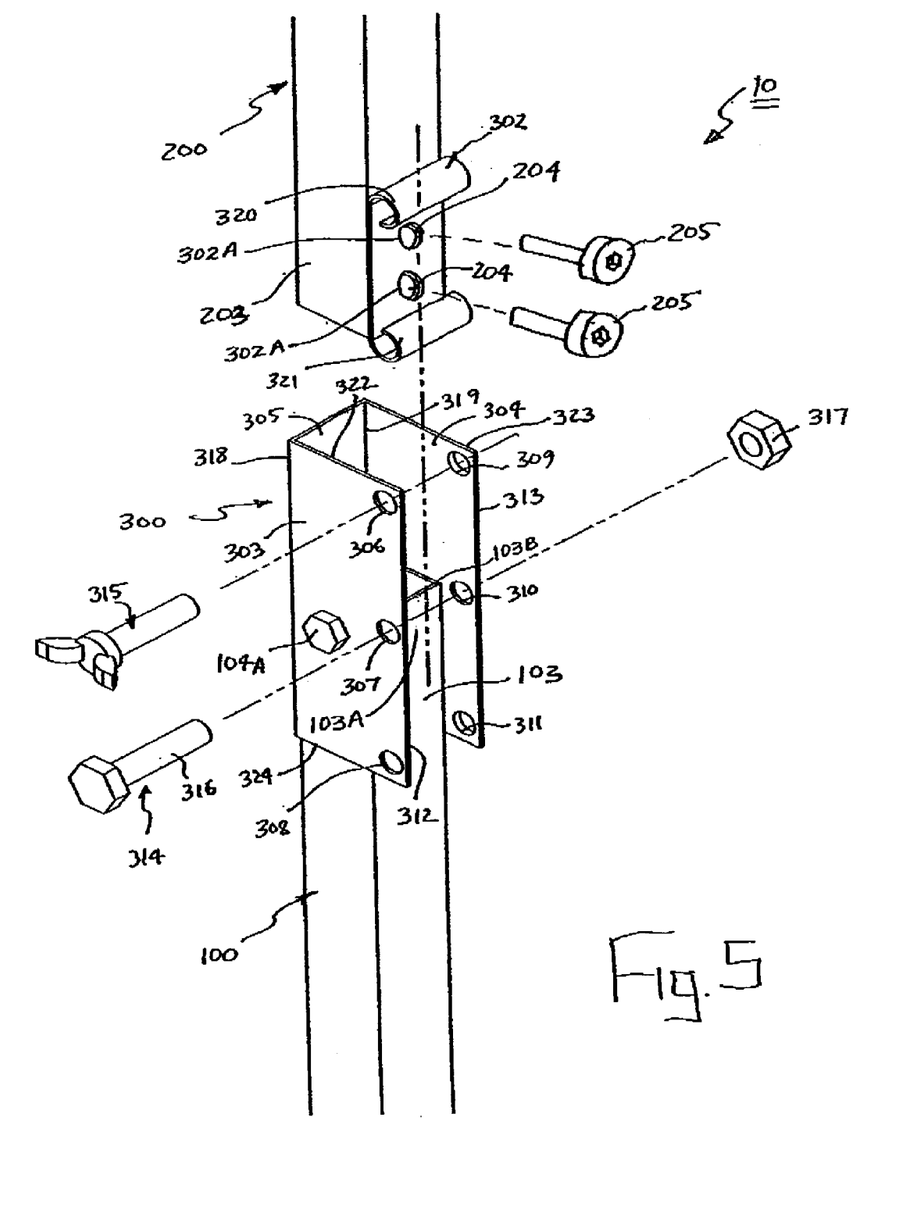
FIG. 5 is a partially fragmented, perspective, exploded view of the cargo bar of FIG. 1.
Figure 6:
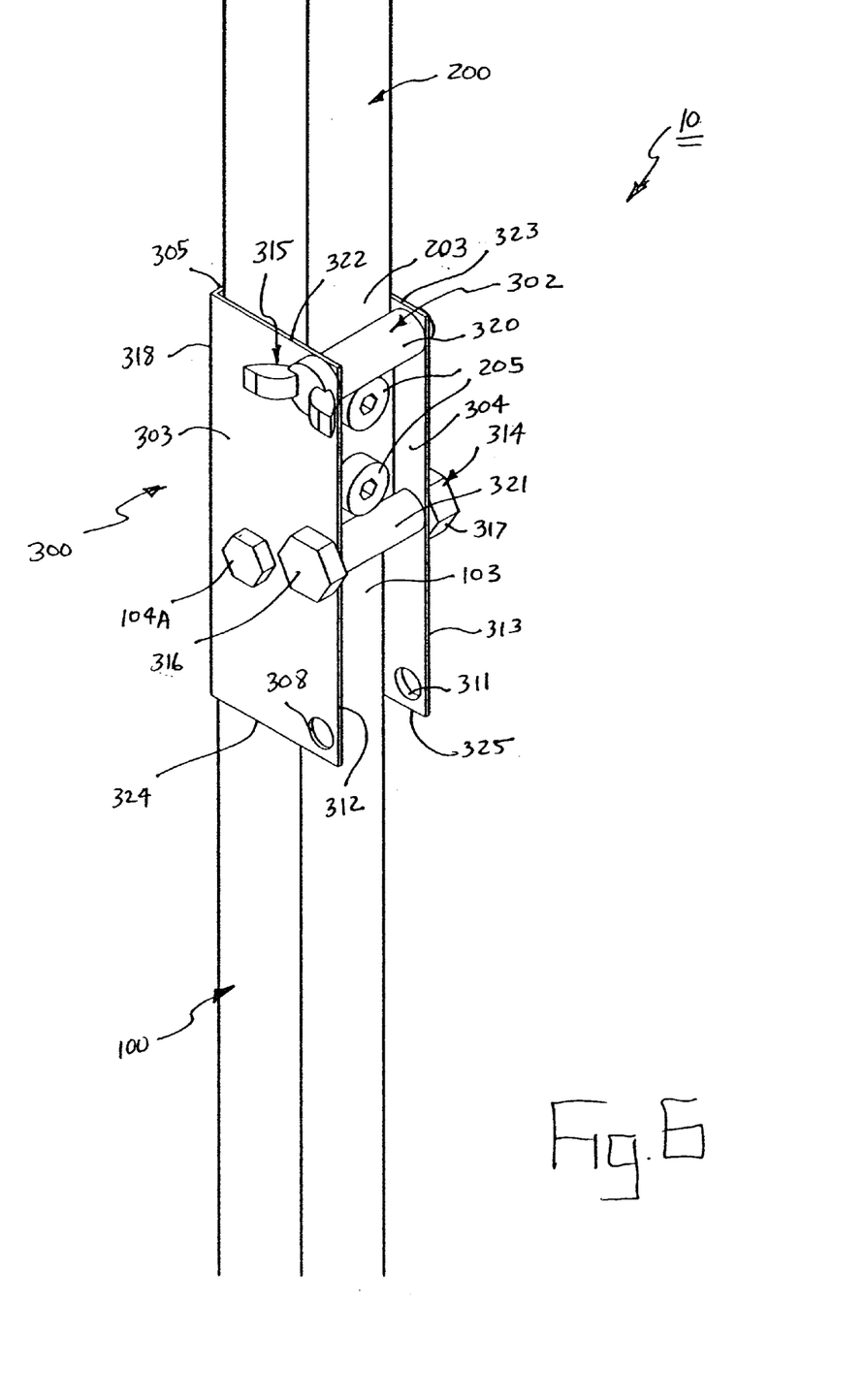
FIG. 6 is a partially fragmented, perspective view of the cargo bar of FIG. 1 shown locked in an extended position.

As best shown in FIG. 5, the other end 203 of second member 200 includes a pair of threaded openings 204 that align with openings 302A formed in a support 302 of hinge 300 as further described below. A pair of threaded fasteners 205 thread through openings 302A in support 302 into openings 204 to secure support 302 to end 203 of second member 200 as shown in FIGS. 4B and 6.

Referring now to FIGS. 2–6, hinge 300 generally includes support 302 and a frame that may include a first plate 303, a second plate 304, and a third plate 305. As further described below, the frame may omit third plate 305 in certain embodiments. Hinge 300 moveably couples first member 100 to second member 200 such that first member 100 and second member 200 may be locked in an axially aligned, extended position for use as a cargo stabilizer, or a substantially parallel, folded position for storage. First plate 303 includes the previously described opening (FIG. 2), and openings 306, 307, and 308. Second plate 304 similarly includes the previously described opening (not shown), and openings 309, 310, and 311. Openings 306–308 are substantially aligned along an axis that is parallel to edge 312 of first plate 303. Similarly, openings 309–311 lie substantially along an axis that is parallel to edge 313 of second plate 304. Opening 306 opposes opening 309, opening 307 opposes opening 310, and opening 308 opposes opening 311. Plates 303, 304 extend beyond surface 103A of end 103 of first member 100 by a distance that is greater than the diameter of openings 306–311. Additionally, openings 306 and 309 are positioned adjacent edges 322, 323 of plates 303, 304, respectively. Similarly, openings 308, 311 are positioned adjacent edges 324, 325 of plates 303, 304, respectively. Openings 307, 310 are centered between openings 306, 309 and openings 308, 311. Accordingly, the distance between the pair of openings 306, 309 and the pair of openings 307, 310 is substantially equal to the distance between the pair of openings 308, 311 and the pair of openings 307, 310. As should be apparent from the drawings, plates 303, 304 also extend beyond an edge 103B of end 103 such that openings 307, 310 are substantially bisected by a plane defined by edge 103B.

Moreover, the distance between the pairs of openings described above, is substantially equal to the distance between the cylindrical openings 320, 321 of support 302 described in further detail below. Openings 306–311 are aligned in the manner described above to receive fasteners 314, 315. More specifically, opening 307 is aligned with opening 310 to receive fastener 314 which may be a bolt 316 that is threaded to receive a nut 317. As will be further described below, openings 306, 309, are aligned to receive fastener 315 to lock cargo bar 10 in the extended position, and openings 308, 311 are aligned to receive fastener 315 to lock cargo bar 10 in the folded position.

Plate 305 of hinge 300 extends substantially perpendicularly between edge 318 of first plate 303 and edge 319 of second plate 304. Thus, first plate 303, second plate 304, and plate 305 form a substantially U-shaped channel section. It should be understood, however, that plate 305 may be eliminated if plates 303, 304 are otherwise securely attached to end 103 of first member 100 to prevent rotation of first plate 303 and second plate 304 relative to first member 100. In one embodiment (best shown in FIGS. 4A–B) plate 305 includes an opening (not shown) for receiving a fastener 305A which also extends into a threaded opening (not shown) in end 103 of first member 100 to secure hinge 300 to first member 100. If, for example, two or more fasteners 104A are used to secure first plate 303 to end 103 and two or more fasteners 104B are used to secure second plate 304 to end 103 of first member 100, then rotation of first plate 303 and second 304 is prevented and plate 305 is unnecessary. Alternatively, if first plate 303 and second plate 304 are welded or otherwise secured attached to end 103 of first member 100, then plate 305 may be omitted.

Support 302 of hinge 300 is attached to end 203 of second member 200 using fasteners 205 as described above. Support 302 includes cylindrical openings 320, 321 formed at the ends of support 302, and best shown in FIG. 5. Cylindrical openings 320, 321 may be formed by bending the ends of support 302 as shown in FIG. 5, or, alternatively, by attaching tubular structures to the opposed ends of support 302. Cylindrical openings 320, 321 need not extend the entire width of support 302, nor be continuous along their length. Instead, cylindrical openings 320, 321 are provided to receive fastener 315, as will be further described below, to thereby connect second member 200 to hinge 300. As should also be apparent from the foregoing, cylindrical openings 320, 321 may, in an alternate embodiment, be directly attached to end 203 of second member 200, thereby eliminating the need for the remainder of support 302, as well as fasteners 205.

Figure 3:
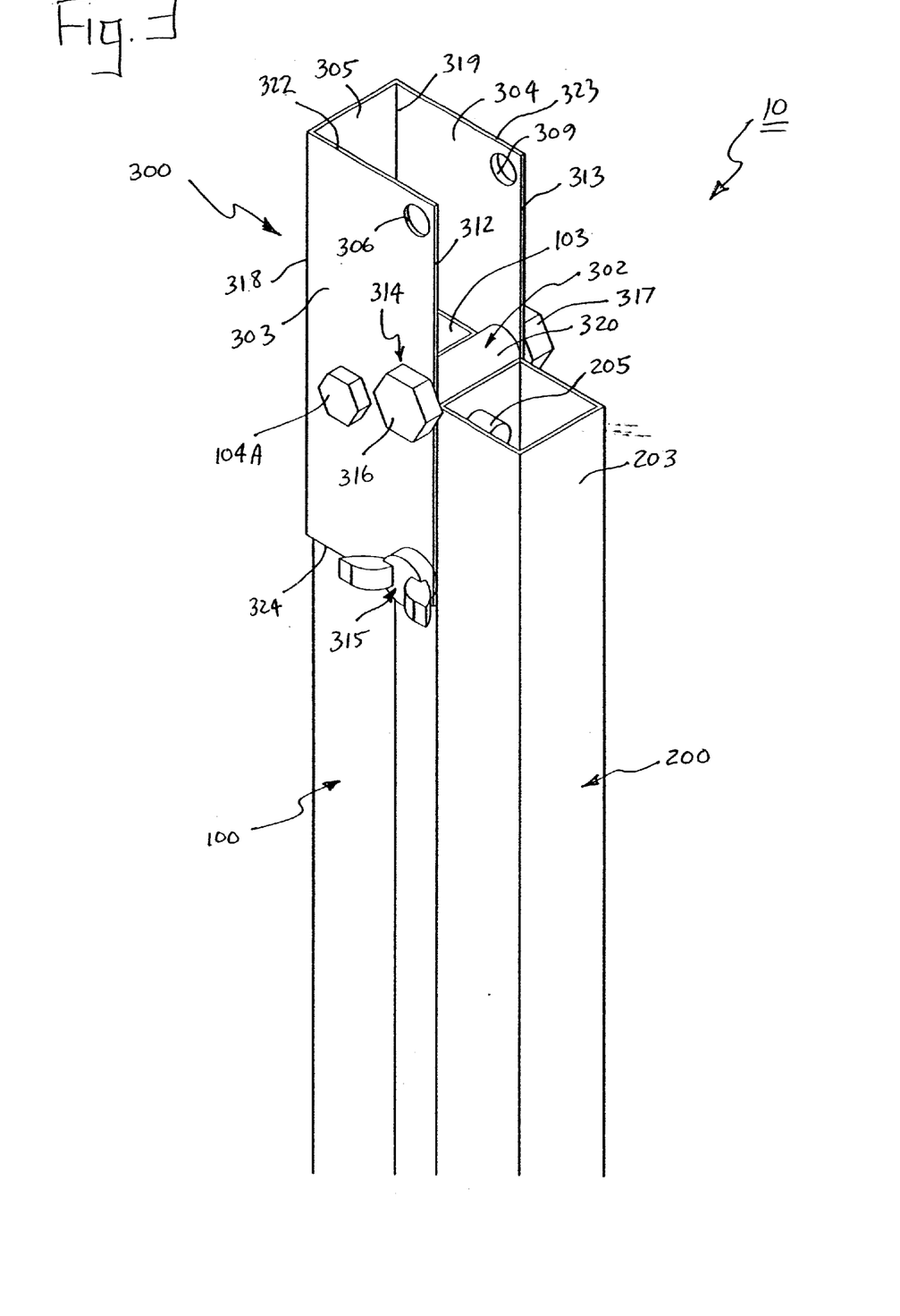
FIG. 3 is a partially fragmented, perspective view of the cargo bar of FIG. 1 locked in a folded position.

Referring now to FIGS. 2 and 3, plates 303–305 of hinge 300 are attached to first member 100 using fasteners 104A–B and 305A in the manner described above. Also, support 302 of hinge 300 is attached to second member 200 using fasteners 205 in the manner described above. First member 100 is pivotally attached to second member 200 using hinge 300 by inserting cylindrical opening 320 of support 302 between first plate 303 and second plate 304 such that cylindrical opening 320 is aligned with openings 307, 310. Fastener 314 is then inserted through opening 307, cylindrical opening 320, and opening 310 to provide a pivotal connection between first member 100 and second member 200. Bolt 316 of fastener 314 then receives nut 317 to secure the assembly.

Cargo bar 10 may be locked in a folded position (as shown in FIG. 3) by rotating end 202 of second member 200 toward end 102 of first member 100 until first member 100 and second member 200 are substantially parallel to one another. Fastener 315 may then be extended through opening 308 of first plate 303, cylindrical opening 321 of support 302, and opening 311 of second plate 304. In one embodiment, fastener 315 may be threaded and opening 311 of plate 304 may be threaded in a manner corresponding to threads of fastener 315. Thus, fastener 315 may be threadably received by opening 311 and tightened by rotating fastener 315 which is shown in the figures as having a wing nut type end. Alternatively, fastener 315 may include a bolt or rod having an enlarged end and an opening at the other end to receive a cotter pin, thereby securing fastener 315 through openings 308, 311 and cylindrical opening 321 and locking cargo bar 10 in the folded position. Of course, fastener 315 may include a convention bolt and nut type fastener or other suitable fastening devices.

Figure 4A:
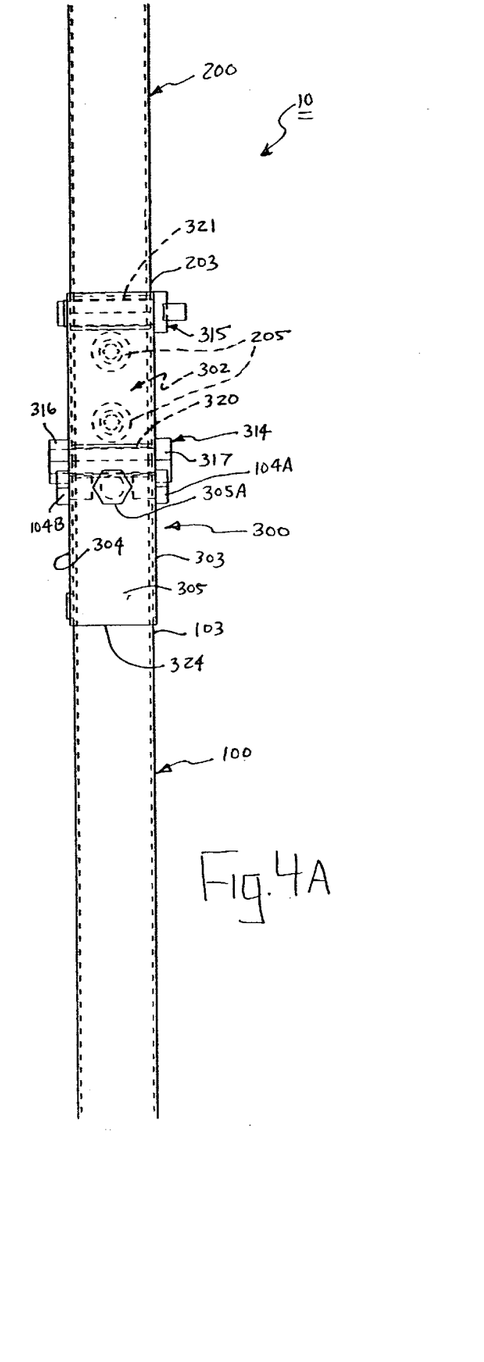
FIG. 4A is a partially fragmented, top plan view of the cargo bar of FIG. 1 shown locked in an extended position.

Referring now to FIGS. 4A–6, cargo bar 10 may also be locked in a extended, in-use position. More specifically, fastener 315 may be removed from opening 308 of first plate 303, cylindrical opening 321 of support 302, and opening 311 of second plate 304 such that second member 200 is free to pivot relative to first member 100 about fastener 314. Second member 200 is pivoted into axial alignment with first member 100 such that a portion of end 203 is received between plates 303, 304 of hinge 300 as shown in FIGS. 4A, 4B, and 6. When second member 200 is aligned with first member 100 such that cargo bar 10 is in the fully extended position, cylindrical opening 320 is positioned between first plate 303 and second plate 304 of hinge 300 and in alignment with openings 306, 309. Cargo bar 10 may be locked in the extended position by inserting fastener 315 through opening 306, cylindrical opening 320, and opening 309 in a manner similar to that described above regarding the use of fastener 315 to lock cargo bar 10 in the folded position.

Once first member 100 and second member 200 are locked into the extended position as described above, articulating, adjustable pad assemblies 101, 201 may be extended from first member 100 and second member 200, respectively, to engage, for example, surfaces 12, 13 of cargo area 14, thereby securely wedging cargo bar 10 between surfaces 12, 13. When in this position (as shown in FIG. 1) cargo bar 10 prevents cargo loaded in cargo area 14 from moving or shifting in a conventional manner.

The foregoing description of the invention is illustrative only, and is not intended to limit the scope of the invention to the precise terms set forth. Although the invention has been described in detail with reference to certain illustrative embodiments, variations and modifications exist within the scope and spirit of the invention as described and defined in the following claims.

What is claimed is:

1. An apparatus for stabilizing cargo in a cargo area including:
    a stabilizing member having a first end, a second end, and a hinge positioned between the first and second ends, the hinge including a locking portion configured to lock the stabilizing member in both an extended position and a folded position, and the ends configured to engage surfaces of the cargo area, the locking portion including a frame coupled to the stabilizing member and a support coupled to the stabilizing member, the support including a first portion and a second portion, the frame including a first plate, a second plate opposing the first plate, and a third plate coupled to the first and second plates.

2. The apparatus of claim 1, wherein the third plate is coupled to the stabilizing member.

3. An apparatus for stabilizing cargo in a cargo area including:
    a stabilizing member having a first end, a second end, and a hinge positioned between the first and second ends, the hinge including a locking portion configured to lock the stabilizing member in one of an extended position and a folded position, and the ends configured to engage surfaces of the cargo area, the locking portion including a frame coupled to the stabilizing member and a support coupled to the stabilizing member, the support including a first portion and a second portion, the frame including a first plate, a second plate opposing the first plate, a first pair of openings, a second pair of openings, and a third pair of openings, one opening of each of the pairs being formed through the first plate, the other opening of each of the pairs being formed through the second plate.

4. The apparatus of claim 3 wherein the one opening of each of the pairs has a center and the other opening of each pair has a center, the centers of the openings of each pair lying substantially on an axis.

5. The apparatus of claim 3 wherein the second pair of openings of the three pairs of openings is positioned between the first and the third pairs of openings and is configured to receive a fastener to pivotally connect the support to the frame.

6. The apparatus of claim 3 wherein the first plate of the support includes a substantially cylindrical opening configured to receive a fastener and the second plate includes a substantially cylindrical opening configured to receive the fastener.

7. The apparatus of claim 6 wherein the cylindrical openings are separated by a first distance and the first and second pairs of openings in the frame are separated by a second distance that is substantially the same as the first distance.

8. The apparatus of claim 7 wherein the second and third pairs of openings in the frame are separated by a third distance that is substantially the same as the second distance.

9. The apparatus of claim 7 further including a first fastener configured to couple the support to the frame by positioning the first fastener through the second pair of openings and the cylindrical opening on the first portion of the support.

10. The apparatus of claim 9 further including a second fastener to removably couple the support to the frame wherein the stabilizing member is configured in the extended position by positioning the second fastener through the first pair of openings and the cylindrical opening on the second portion of the support and the folded position by positioning the second fastener through the third pair of openings and the cylindrical opening on the second portion of the support.

11. An apparatus for stabilizing cargo in a cargo area including:
    a stabilizing member having a first end, a second end, and a hinge positioned between the first and second ends, the hinge including a locking portion configured to lock the stabilizing member in both an extended position and a folded position, and the ends configured to engage surfaces of the cargo area;
    the locking portion further including, a frame coupled to the stabilizing member, and a support coupled to the stabilizing member wherein the support includes a first portion and a second portion;
    wherein the first portion includes a substantially cylindrical opening configured to receive a first fastener;
    wherein the second portion includes a substantially cylindrical opening configured to receive a second fastener; and
    wherein the frame includes three pairs of openings, one opening of each of the pairs being formed through the first plate, the other opening of each of the pairs being formed through the second plate, the three pairs of openings including a first pair, a second pair, and a third pair.

12. The apparatus of claim 11 wherein the support is pivotally coupled to the frame by positioning the first fastener through the second pair of openings and the cylindrical opening in the first portion.

13. The apparatus of claim 12 wherein the stabilizing member is secured in the extended position by positioning the second fastener through the first pair of openings in the frame and the cylindrical opening in the second portion of the support and in the folded position by positioning the second fastener through the third pair of openings in the frame and the cylindrical opening in the second position of the support.

14. An apparatus for stabilizing cargo including:
a first member including a first end and a second end, the second end configured to engage a first surface of a cargo area;
a second member including a first end and a second end, the second end configured to engage a second surface of the cargo area; and
a coupler configured to couple the first end of the first member to the first end of the second member, the coupler further configured to secure the first member and the second member in one of an extended position and a folded position, the coupler including a frame coupled to the first member, and a support coupled to the second member, the support including a first portion and a second portion, the frame including a first plate, a second plate opposing the first plate, and three pairs of openings, one opening of each of the pairs being formed through the first plate, the other opening of each of the pairs being formed through the second plate, the three pairs of openings including a first pair, a second pair, and a third pair.

15. An apparatus for stabilizing cargo including:
a first member including a first end and a second end, the second end configured to engage a first surface of a cargo area;
a second member including a first end and a second end, the second end configured to engage a second surface of the cargo area; and
a coupler configured to couple the first end of the first member to the first end of the second member, the coupler further configured to secure the first member and the second member in one of an extended position and a folded position, the coupler including a frame coupled to the first member, and a support coupled to the second member, the support including a first portion and a second portion, the first portion including a substantially cylindrical opening configured to receive a first fastener to rotatably couple the first and the second members to one another.

16. The apparatus of claim 15 wherein the second portion includes a substantially cylindrical opening configured to removably receive a second fastener to lock the first and the second members in the extended position and the folded position.

17. The apparatus of claim 16 wherein the frame includes three pairs of openings, one opening of each of the pairs being formed through the first plate, the other opening of each of the pairs being formed through the second plate, the three pairs of openings including a first pair, a second pair, and a third pair.

18. An cargo stabilizer including:
a first member having a first end and a second end, the second end configured to engage a first surface of a cargo area;
a second member including a first end and a second end, the second end configured to engage a second surface of the cargo area;
a hinge coupled to the first end of the first member, the hinge including a first plate, a second plate opposing the first plate, and a third plate connecting the first plate to the second opposing plate, the hinge having three pairs of openings including a first pair, a second pair, and a third pair, one opening of each of the pairs being formed through the first plate, the other opening of each of the pairs being formed through the second plate;
a support coupled to the first end of the second member wherein the support includes a first portion forming a first opening and a second portion forming a second opening at a first distance from the first opening, wherein the first distance is substantially the same as a distance between the first and second pairs of openings in the first and second plates of the frame;
a first fastener configured to pivotally couple the support to the hinge wherein the first fastener extends through the second pair of openings in the hinge and the first opening of the support; and
a second fastener to couple the support to the hinge;
the cargo stabilizer being movable between an extended position wherein the second fastener extends through the first pair of openings and the second opening of the support and a folded position wherein the second fastener extends through the third pair of openings and the second opening of the support.

19. An apparatus for stabilizing cargo in a cargo area including:
a stabilizing member having a first end, a second end, and a hinge positioned between the first and second ends, the hinge including a locking portion configured to lock the stabilizing member in both an extended position and a folded position, and the ends configured to engage surfaces of the cargo area, the locking portion including a pin configured to be received in a first position to lock the stabilizing member in the extended position and a second position to lock the stabilizing member in the folded position.

* * * * *